Dec. 23, 1952   A. J. HORNFECK   2,623,206
CONTROL SYSTEM

Filed June 29, 1945   2 SHEETS—SHEET 1

INVENTOR.
ANTHONY J. HORNFECK
BY Raymond W. Jenkins
ATTORNEY

Dec. 23, 1952 A. J. HORNFECK 2,623,206
CONTROL SYSTEM
Filed June 29, 1945 2 SHEETS—SHEET 2

INVENTOR.
ANTHONY J. HORNFECK
BY
ATTORNEY

Patented Dec. 23, 1952

2,623,206

UNITED STATES PATENT OFFICE 2,623,206

CONTROL SYSTEM

Anthony J. Hornfeck, Cleveland Heights, Ohio, assignor to Bailey Meter Company, a corporation of Delaware Application June 29, 1945, Serial No. 602,333

14 Claims. (Cl. 323—75)

The present invention relates to measuring and/or control systems, particularly of the electronic circuit type. A variable condition, quantity, position or other value, which may be represented by an electrical resistance value, may be continuously and instantaneously measured through the agency of the circuit to be described.

The invention may be said to comprise improvements in a balanceable bridge network sensitive to a condition to be determined or measured. Specifically a phase sensitive alternating current bridge has two fixed resistance arms, a third arm comprising a resistance whose value varies representative of the condition being measused, and a fourth arm comprising a balancing means for the network.

Such phase sensitive alternating current bridges for measuring resistance values are not new. To the best of my knowledge, however, such a balanceable network including electronic amplification and motor control has not previously been applied to the determination of the value of a resistance representing temperature subjected to electrical conditions destructive to the measuring apparatus and hazardous to humans. As a specific example of such an application I illustrate and describe my invention applied to the continuous and instantaneous determination of the temperature of a heated copper block which is at 35,000 volts direct current above ground. This illustration is however merely representative of the requirements of present day research and industry wherein it is desirable to ascertain temperatures of parts within electrical or electronic apparatus and where such parts may be at a very considerable potential above ground.

As the description proceeds it will become evident that my improvements in balanceable electrical networks are readily applicable to the determination of resistance values representative of other variables than temperature, and where the dangerous electrical conditions to which the measuring element is subjected may be other than direct current and other than voltage.

Figure 1:
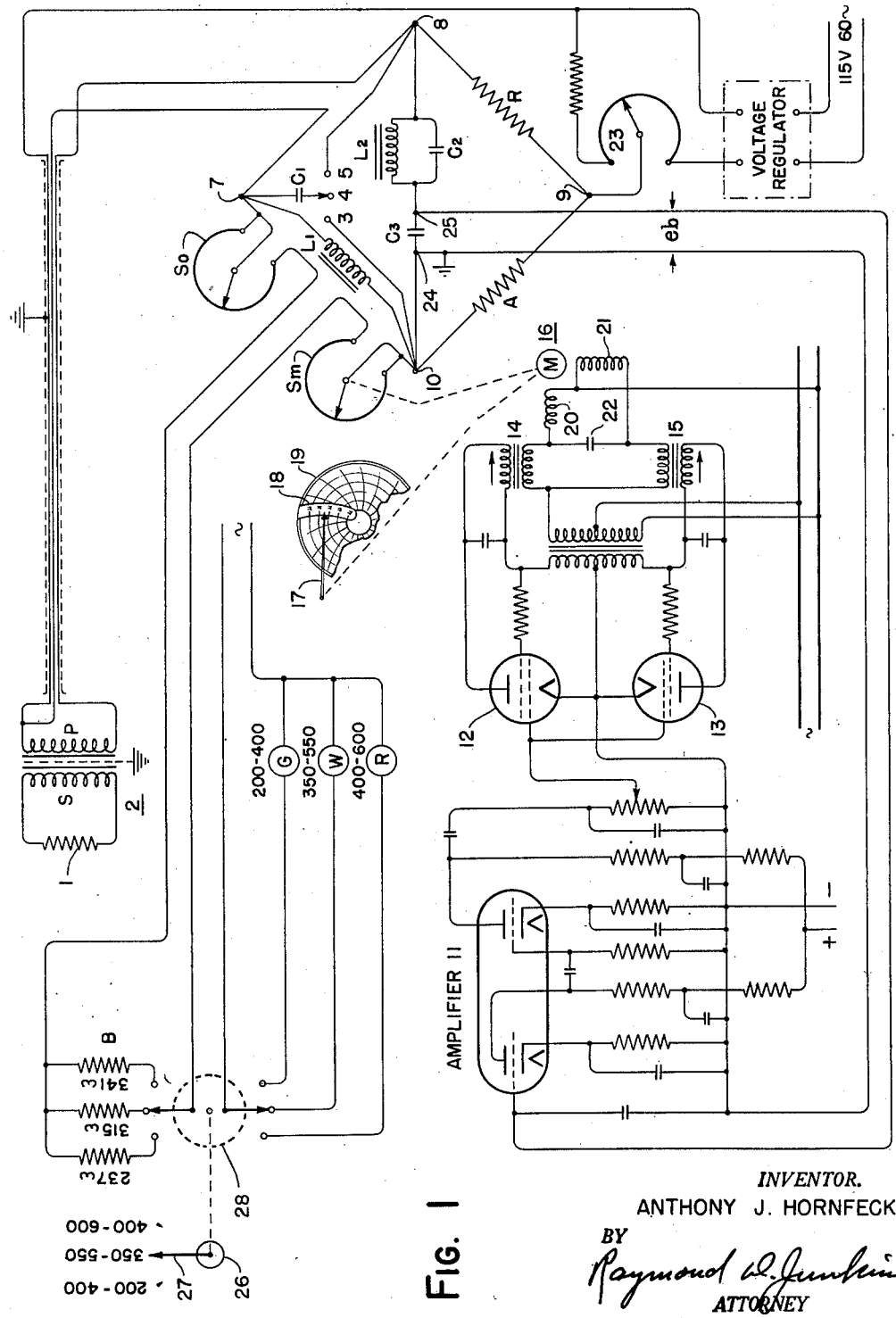
Fig. 1 is a diagrammatic representation of a balanceable electric network embodying my invention.

Referring now to Fig. 1, I indicate thereon a temperature sensitive measuring element 1 comprising a platinum resistance having a value of 22.275 ohms at 460° C. I give these values, not as limiting but merely as an example, to carry through the description of a specific set of values for component parts of the network, believing that an understanding of my invention will be facilitated.

The platinum resistance measuring element (in the present example) is located in and sensitive to temperature of a copper block which is at 35,000 volts direct-current above ground. This element is insulated from the measuring circuit by a special transformer 2 to protect the apparatus and the operators from the high direct current voltage. The measuring circuit instantaneously and continuously measures the electrical resistance (varying with temperature) of the platinum element 1 as reflected through the transformer winding; the transformer acting merely as an insulator between a sensitive element and the measuring network.

For an understanding of a phase sensitive alternating current bridge for measuring the resistance of a leg of said bridge subjected to temperature reference may be had to the Ryder Patents 2,275,317 and 2,333,393. In the disclosure of these patents the temperature sensitive element (preferably platinum) was not subjected to electrical conditions other than those of the bridge of which it is a part.

The circuit arrangement of Fig. 1 includes improvements to a phase sensitive alternating current network to compensate for the self inductance of the insulating transformer 2 and to minimize the harmonic unbalance produced by its magnetic iron core. Other specific improvements will be discussed as the description proceeds.

Figure 2:
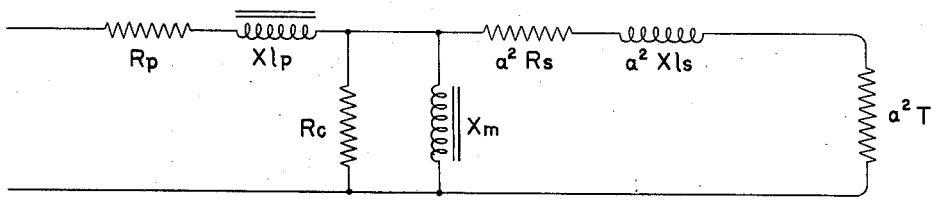
Fig. 2 is a transformer equivalent circuit of Fig. 1.

Theoretically, if the transformer 2 had a negligible core loss, negligible exciting current and unity coupling (zero leakage reactance) it would introduce no particular problem and the Ryder resistance bridge could be used. In that case the resistance of the measuring bridge leg T would be simply the transformer ratio squared multiplied by the actual resistance of the temperature element 1. Actually, however, the exciting current and core loss are by no means negligible and are of the same order of magnitude as the primary load current and the power dissipated in the platinum element resistance. The transformer equivalent circuit is shown in Fig. 2 wherein:

$Rp$ = primary winding resistance
$Rs$ = secondary winding resistance
$Xlp$ = primary leakage reactance
$Xls$ = secondary leakage reactance
$T$ = platinum element resistance
$a$ = transformer ratio
$Rc$ = core loss resistance
$Xm$ = magnetizing reactance.

Figure 3:
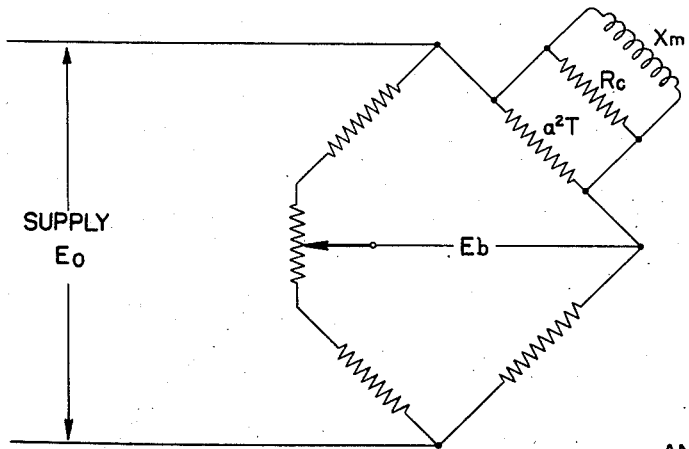
Fig. 3 is a simple bridge circuit related to Fig. 2.

In this example, $Rp$, $a^2Rs$, $Xlp$ and $a^2Xls$ are small compared to the reflected element resistance (less than 1%) and they are neglected in this analysis. The value of both $Xm$ and $Rc$ change with values of applied voltage and both increase with voltage at low flux densities. Furthermore, the magnetizing current $Im$ is not sinusoidal but has large components of higher than supply frequency. If a simple bridge is devised with this element as one arm, and pure resistances as the other arms, as shown by Fig. 3, it would be extremely difficult to measure T accurately. The null balance would be obscured by large out-of-phase and harmonic voltages produced by the transformer magnetizing current. These voltages would paralyze the electronic amplifier and motor control circuits so that the recorder response would be extremely sluggish and inaccurate.

The resistance measured by a circuit such as Fig. 3 is not the true resistance of the platinum element T, or its ratio $a^2T$, but the equivalent series resistance of the arm as modified by the shunt magnetizing reactance $Xm$ and the core loss resistance $Rc$. The shunting effect of these elements has the added effect of reducing the sensitivity of the bridge to changes in T.

It may be shown that the equivalent series resistance $Rs$ of such a circuit is—

$$Rs = \frac{Rp \times (Xm)^2}{(Rp)^2 + (Xm)^2}$$

where $Rp$ is the actual parallel resistance including the reflected element resistance and the core loss resistance.

$$Rp = \frac{a^2 T Rc}{a^2 T + Rc}$$

The masking effect of the core loss and magnetizing circuit may be shown by the following calculations:
At 540° C.:

$$T = 22.0 \text{ ohms}$$

$$a^2 T = 16 \times 22 = 352 \text{ ohms}$$

If $Rc = 1000$ ohms, then $$Rp = \frac{352 \times 1000}{352 + 1000} = 260 \text{ ohms}$$

If $Xm = 500$ ohms $$Rs = \frac{260 \times (500)^2}{(260)^2 + (500)^2} = 204.5 \text{ ohms}$$

At 550° C.:

$$T = 24.79 \text{ ohms}$$

$$a^2 T = 16 \times 24.79 = 396.5 \text{ ohms}$$

$$Rp = \frac{396.5 \times 1000}{396.5 + 1000} = 284 \text{ ohms}$$

$$Rs = \frac{284 \times (500)^2}{(284)^2 + (500)^2} = 215.0 \text{ ohms}$$

Equivalent resistance change per °C.=

$$\frac{215.0 - 204.5}{100} = .105 \text{ ohms/°C.}$$

This compares with a theoretical change of $$\frac{396.5 - 352}{100} = .445 \text{ ohms/°C.}$$

based on negligible core loss and magnetizing current.

It is obvious that changes in inductance and core loss of the insulating transformer, such as might be produced by changes in bridge voltage, will affect the calibration unless compensated.

The phase sensitive alternating current bridge has four legs 7—8, 8—9, 9—10 and 10—7. Leg 7—8 includes the transformer winding P responsive to the temperature to be measured. Legs 8—9 and 9—10 are indicated respectively as resistances R and A of 200 ohms each (in the present example). Leg 10—7 includes a resistance B of adjustable value, as well as the adjustable resistance So (line compensating adjustment) and adjustable resistance Sm which is the balancing resistance for balancing the bridge following an unbalance thereof as may be caused by a variation in the value of P.

The bridge is supplied across points 7 and 9 with a source of alternating current at from 3 to 6 volts. The conjugate voltage Eb between the points 10 and 8 assumes a balance or unbalance and a phase relation relative to the supply voltage dependent upon the magnitude and sense of the condition between the points 10 and 8. Inserted between the points 10 and 8 and receptive to the voltage Eb is a phase responsive amplifier 11 selectively controlling motor tubes 12, 13. The tubes 12, 13 control the amount and direction of unbalance of saturable core reactors 14, 15 for directional and speed control of a capacitor-run motor 16 adapted to position the balancing resistor Sm and to simultaneously position an indicator 17 relative an index 18 and a time driven recording chart 19 for visually demonstrating the value of temperature to which the element 1 is sensitive.

The motor 16 is of an alternating current type having windings 20 and 21 ninety electrical degrees apart and also having a capacitor 22. When alternating current flows directly through one of the windings and simultaneously through the other winding in series with the capacitor the motor rotates in predetermined direction and at at a speed determined by the extent of unbalance of the saturable core reactors 14, 15.

It is not necessary to go into greater detail as to the construction and operation of the amplifier 11 and the motor control circuit, as reference may be had to the above mentioned Ryder patents.

In order to obtain a balance of the bridge a compensating reactance Ll in parallel with the measuring and balancing slide wire Sm is used to balance the self-inductance and core losses of the transformer primary P. If this compensator Ll inductance is not equal to the transformer inductance, a 90° residual voltage will exist across the bridge output Eb when the circuit is balanced for resistance. This voltage Eb, if large enough, will result in insensitive and inaccurate operation of the recorder. This inductor is designed to have the same reactance and approximately the same core loss, and is connected in parallel with the balancing slide wire $Sm$ and suppression resistor B. It is also designed to have almost, but not quite, the same rate of change of reactance with voltage as the insulating transformer 2.

Figure 4:
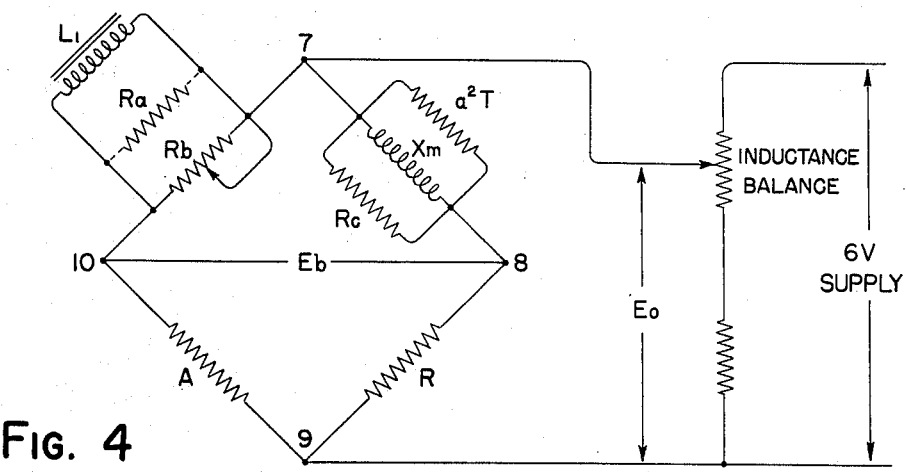
Fig. 4 is a simplified diagram of the bridge of Fig. 1.

The bridge is designed to balance at unity ratio so that the resistance in the balancing arm is approximately equal to the reflected resistance of the platinum element ($a^2T$). Fig. 4 is a simplified diagram of the bridge on this basis.

It may be readily shown that $A=R$, the bridge is balanced ($Eb=0$) when the following simple relations are satisfied:

$$Ll = Xm$$

$$Rb = a^2T$$

Where it is assumed that $Ra=Rc$.

$Rb$ in this example represents the balancing resistance of the arm 10—7 including $Sm$. $Ra$ is the equivalent resistance of the compensating inductor. $Ll$ is the reactance of the compensating inductor.

It is impossible to obtain simultaneously balance of the bridge for fundamental 60 cycle frequency as well as for harmonics of this frequency produced by the iron cores or from the supply unless the compensating inductor is the exact duplicate of the transformer. Since the latter is a very large and bulky unit (of necessity due to insulation) the practical solution is a harmonic filter which effectively traps the residual harmonic unbalance existing when the bridge is balanced for the fundamental.

As shown in the complete circuit diagram of Fig. 1 this output filter circuit comprises $L_2$, $C_2$ and $C_3$ connected across the points 10—8 and performs two important functions.

1. It shifts the phase of the unbalanced voltage $Eb$, to correct for phase shift in the bridge. This is necessary to make the input to the amplifier 11 in phase with the supply voltage when the bridge is unbalanced due to resistance change produced by a temperature change in the element 1. In this case small inductive unbalance between the compensator $Ll$ and the transformer produces a voltage 90° out of phase with the supply and has the effect of making the balancing motor 16 less sensitive, but does not produce rotation. As a result the readjustment of the inductive components to establish sensitive operation has little or no effect on the calibration. Large inductive unbalances will, however, affect the resistance balance and will cause motor rotation.

2. This wave filter is of the tuned circuit type designed so that the parallel components $L_2$ and $C_2$ are in resonance at 180 cycles. This is the most severe of the harmonics produced by the iron cores and is reduced to a negligible value since the parallel resonance circuit has infinite impedance (neglecting resistance) at the tuned frequency.

Series resonance occurs at about 85 cycles, at which frequency the capacitor $C_3$ is in resonance with the equivalent inductance of the parallel $L_2$, $C_2$ circuit. At this value of frequency the output voltage is more than three times the input voltage. At the operating frequency the step-up in voltage is about 1.5 to 1 so that considerable increase in sensitivity is obtained.

The importance of securing a close balance between the self-inductance of the compensator $Ll$ and that of the transformer to secure sensitive operation of the amplifier 11 and motor control circuit has already been emphasized. Some means of obtaining a fine balance must be provided since it is not possible to match all transformers and inductors as accurately as would be required. It is reasonable to assume that these units can be manufactured so that they balance to within plus or minus 5% of one or another.

An approximate balance can be obtained by placing one or more capacitors in parallel with the transformer or inductor, depending on which has the greater inductance. The effect of such a parallel capacitor is to increase the equivalent reactance as shown by the following equation:

$$X'_L = \frac{X_c}{X_c - X_L}$$

where $X'_L$ = equivalent parallel reactance $X_c$ = capacitator reactor = $\frac{1}{\omega C}$ $X_L$ = the actual inductive reactance = $\omega L$ $\omega = 2\pi$ times frequency Close balance is obtained by adjusting the bridge voltage supply by means of a potentiometer 23 until the reactance of the measuring bridge arm P is equal to that of the balancing arm $Sm$. This is indicated by zero out-of-phase component of bridge unbalance as measured at the bridge output terminals 24—25. The reactance of the compensating inductor changes at a slightly faster rate with supply voltage than the transformer. At some value of voltage the two characteristics intersect and at this point the reactive components are exactly balanced. The calibration of the circuit is not materially affected by this voltage adjustment since the losses in the two units change at very nearly the same rate with voltage.

In some cases the variation within the transformer and inductor may be great enough to prevent matching over the range of voltage adjustment. In this case a capacitor $Cl$ is connected in parallel with one of the arms (either P or $Sm$) to bring it into the range of the voltage adjustment. Thus, as indicated in Fig. 1, the capacitor $Cl$ may be connected to the terminal 3 or to the terminal 5 as found desirable.

I have previously mentioned the resistor B in the arm 7—10 and would now point out that I provide, at the measuring instrument or at a remote location, a means for readily changing the temperature range of the measuring network. As illustrated in Fig. 1, the resistor B may have three selective values, such for example as 237 ohms, 315 ohms, or 341 ohms. These resistance values correspond respectively to a temperature range of 200–400° C., 350–550° C., and 400–600° C. It will be observed that the range of 200° C. remains the same, but that this span may be shifted selectively to any one of three locations. I provide (diagrammatically) a hand adjustable knob 26 arranged to move a pointer 27 to indicate which of the three ranges is in use and to simultaneously position a switch means 28 to connect the proper ohmic value of B into the arm 10—7. At the same time I may (at another location if desired) light a signal light of one color or another to indicate which range is in service.

The described range changing feature of the present invention is superimposed upon the measuring network without in any degree affecting the accuracy thereof, and constitutes an important part of my invention. To my knowledge it has not previously been possible to locally or remotely so change the operating and measuring range of such an instrument by merely turning a selective knob.

In the previous description it is important to remember that I have used specific values and examples merely as illustrative of one embodiment of my invention. Such usage is not to be considered as restrictive.

What I claim as new, and desire to secure by Letters Patent of the United States, is:

1. An alternating current bridge including, in combination, balanced impedance arms, a measuring arm containing a transformer primary, a secondary coupled to said primary and loaded by a variable resistance to be measured, a balancing arm containing an adjustable balancing resistor and an inductive reactor to compensate for said transformer inductance, said inductive reactor and said transformer having slightly different rates of change of reactance upon a change in voltage, means to supply alternating current to one diagonal of said bridge, means to regulate the potential of said current to balance said transformer and reactor reactances, an output diagonal for said bridge, a filter in said output diagonal comprising a capacitance and inductance in parallel resonance at a harmonic of the fundamental frequency of the supply source, and means connected in said output diagonal to provide an approach to series resonance at the said fundamental frequency.

2. The bridge as defined in claim 1 in which means is provided for optionally paralleling either bridge arm reactance with a fixed capacitance.

3. A self-balancing A.-C. bridge including in combination, balanced impedance arms, a measuring arm containing the primary of a transformer having a secondary loaded by a variable resistance to be measured, a balancing arm containing an adjustable balancing resistor and an inductive reactor to compensate for said transformer inductance, means for supplying alternating current to one diagonal of said bridge, an output diagonal for said bridge, a filter in said output diagonal comprising a capacitance and an inductance in parallel resonance at a harmonic of the fundamental frequency of the supply source, and means connected in said output diagonal in series with said filter to provide series resonance therewith at the said fundamental frequency.

4. An A.-C. bridge including in combination, balanced impedance arms, a measuring arm for a variable resistance to be measured, an iron core transformer coupling said resistor into said arm, a balancing arm containing an adjustable balancing resistor and an iron core inductive reactor, the reactances of said reactor and said transformer changing at slightly different rates with changes in supply voltage to the bridge, adjustable means for supplying an alternating current to said bridge at different voltages, an output diagonal for said bridge, and means in said output diagonal to exclude at least a harmonic of the fundamental frequency of the supply source.

5. An A.-C. bridge including in combination, balanced impedance arms, a measuring arm for a variable resistance to be measured, an iron core transformer coupling said resistor into said arm, a balancing arm containing an adjustable balancing resistor and an iron core inductive reactor to balance said transformer inductance, the reactances of said reactor and said transformer changing at slightly different rates with changes in supply voltage to the bridge, adjustable means for supplying alternating current to one diagonal of said bridge at different voltages, output connections from another diagonal of said bridge, means in one of said output connections to exclude at least a harmonic of the fundamental frequency of the supply source, and a condenser in series with said excluding means and shunting said output connections.

6. A measuring bridge including in combination; balanced impedance arms; a measuring arm containing a transformer primary, a secondary coupled to said primary and loaded by a variable resistance to be measured by reflection into the bridge; a balancing arm containing an adjustable balancing resistor, a range adjusting resistor and an inductive reactor shunting the whole arm to compensate for said transformer inductance; the reactances of said reactor and said transformer varying at slightly different rates with changes in supply voltage to the bridge, means to energize said bridge by alternating current, adjusting means for the potential of said current; an output circuit for said bridge; and means in said output circuit to provide partial resonance at the fundamental of the A.-C. frequency to increase the bridge output voltage.

7. The bridge as defined in claim 6 having impedance means and circuit means combining a portion of said means to provide partial resonance in the output circuit with said impedance means to form a resonant rejection circuit for the third harmonic of said energizing A.-C.

8. A measuring bridge including in combination; balanced impedance arms; a measuring arm containing a transformer primary, a secondary coupled to said primary and loaded by a variable resistance to be measured by reflection into the bridge; a balancing arm containing an adjustable balancing resistor, an inductive reactor shunting said resistor to compensate for the inductance and core losses of the transformer; said transformer and said reactor having self inductance and core losses which differ within manufacturing tolerances and change along difference slopes with voltage change; means to supply alternating current to one diagonal of said bridge, means to provide minute adjustment of the alternating current supply voltage whereby the reactances of the transformer and reactor may be equalized; and means sensitive to the phase of current in the other diagonal of the bridge.

9. A measuring bridge including in combination; balanced impedance arms; a measuring arm containing a transformer primary, a secondary coupled to said primary and loaded by a variable resistance to be measured by reflection into the bridge; a balancing arm containing an adjustable balancing resistor, an inductive reactor shunting said balancing arm to compensate for the reactance of the transformer; said transformer and said reactor having reactances differing within manufacturing tolerances and having slightly different rates of change of reactance with change of voltage; means to supply alternating current to one diagonal of the bridge; means associated with the other diagonal of the bridge to detect changes in phase of current therein; and means to minutely adjust the voltage supplied to the first diagonal whereby the reactances of the transformer and reactor may be equalized.

10. A measuring bridge including in combination; balanced impedance arms; a measuring arm containing a transformer primary, a secondary coupled to said primary and loaded by a variable resistance to be measured by reflection into the bridge; a balancing arm containing an adjustable balancing resistor, an inductive reactor shunting said balancing arm to compensate for the reactance of the transformer; said transformer and said reactor having reactances differing within manufacturing tolerances and having slightly different rates of change of reactance with change of voltage; means to supply alternating current to one diagonal of the bridge; means associated with the other diagonal of the bridge to detect changes in phase of current therein; means to automatically maintain a fixed voltage supply for said first diagonal and means to minutely adjust said voltage to equalize the reactances of the transformer and reactor.

11. A measuring bridge including in combination; balance impedance arms; a measuring arm containing a transformer primary, a secondary coupled to said primary and loaded by a variable resistance to be measured by reflection into the bridge; a balancing arm containing an adjustable balancing resistor, an inductive reactor shunting said balancing arm to compensate for the reactance of the transformer; said transformer and said reactor having reactances which differ and which have different rates of change of reactance with change of voltage; means to supply alternating current to one diagonal of the bridge; means associated with the other diagonal of the bridge to detect changes in phase of current therein; means to automatically maintain a fixed voltage supply for said first diagonal, means to minutely adjust said voltage to equalize small differences in the reactances of the transformer and reactor, and means to selectively associate a condenser with either the transformer or the reactor to compensate for larger differences in said reactances.

12. An alternating current bridge including in combination, balanced impedance arms, a measuring arm containing a transformer primary, a secondary coupled to said primary and loaded by a variable resistance to be measured, a balancing arm containing an adjustable balancing resistor and an inductive reactor to compensate for said transformer inductance, said inductive reactor and said transformer having slightly different rates of change of reactance upon a change in voltage, means to supply alternating current to one diagonal of said bridge, means to regulate the potential of said current to balance said transformer and reactor reactances, and an output diagonal for said bridge.

13. The bridge as defined in claim 12 in which means is provided for optionally paralleling either bridge arm reactance with a fixed capacitance.

14. A measuring bridge including in combination; a measuring arm having inductive reactance and a resistance varying in value with changes in a condition; a pair of balanced impedance arms; and a balancing arm including, a variable balancing resistor, an adjustable line compensating resistor, a group of range adjusting resistors wherein each has a value with respect to the remaining resistors that their values overlap to provide continuous measurement over the condition change and an inductive reactor, means to selectively connect one of said range adjusting resistors in series with each of the other resistors in said arm, and means for connecting the inductive reactor in parallel with said series connected resistors.

ANTHONY J. HORNFECK.

REFERENCES CITED

The following references are of record in the file of this patent:

UNITED STATES PATENTS

| Number | Name | Date |
|---|---|---|
| 1,537,281 | Wunsch | May 12, 1925 |
| 1,820,214 | Borden | Aug. 25, 1931 |
| 1,954,996 | Hehn | Apr. 17, 1934 |
| 2,056,996 | Zuschlag | Oct. 13, 1936 |
| 2,166,935 | Adams | July 25, 1939 |
| 2,315,593 | Cassen | Apr. 6, 1943 |
| 2,365,706 | Keinath | Dec. 26, 1944 |
| 2,369,070 | Neilsen | Feb. 6, 1945 |
| 2,371,395 | Keeling, Jr. | Mar. 13, 1945 |
| 2,389,615 | Eder | Nov. 27, 1945 |
| 2,402,210 | Ryder et al. | June 18, 1946 |
| 2,455,520 | Prudhon et al. | Dec. 7, 1948 |

FOREIGN PATENTS

| Number | Country | Date |
|---|---|---|
| 8,154 | Australia | Dec. 13, 1932 |